US011294812B2

(12) United States Patent
Peterson et al.

(10) Patent No.: US 11,294,812 B2
(45) Date of Patent: Apr. 5, 2022

(54) OBTAINING CACHE RESOURCES FOR EXPECTED WRITES TO TRACKS IN A WRITE SET AFTER THE CACHE RESOURCES WERE RELEASED FOR THE TRACKS IN THE WRITE SET

(71) Applicant: INTERNATIONAL BUSINESS MACHINES CORPORATION, Armonk, NY (US)

(72) Inventors: Beth Ann Peterson, Tucson, AZ (US); Chung Man Fung, San Francisco, CA (US); Matthew J. Kalos, Tucson, AZ (US); Matthew Richard Craig, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 17 days.

(21) Appl. No.: 16/985,215

(22) Filed: Aug. 4, 2020

(65) Prior Publication Data

US 2022/0043750 A1 Feb. 10, 2022

(51) Int. Cl.
*G06F 12/0862* (2016.01)
*G06F 3/06* (2006.01)
*G06F 12/0806* (2016.01)

(52) U.S. Cl.
CPC ........ *G06F 12/0862* (2013.01); *G06F 3/0604* (2013.01); *G06F 3/0655* (2013.01); *G06F 3/0676* (2013.01); *G06F 3/0679* (2013.01); *G06F 3/0689* (2013.01); *G06F 12/0806* (2013.01); *G06F 2212/602* (2013.01)

(58) Field of Classification Search
None
See application file for complete search history.

(56) References Cited

U.S. PATENT DOCUMENTS

| 8,190,832 | B2 | 5/2012 | Dickey et al. |
| 8,595,455 | B2 | 11/2013 | Chatterjee et al. |
| 8,631,190 | B2 | 1/2014 | Benhase et al. |
| 9,336,047 | B2 | 5/2016 | Busaba et al. |
| 9,372,751 | B2 | 6/2016 | McNutt |
| 9,671,975 | B2 | 6/2017 | Perez et al. |

(Continued)

FOREIGN PATENT DOCUMENTS

| CN | 101122888 A | 2/2008 |
| CN | 103703440 A | 4/2014 |
| CN | 110554976 A | 12/2019 |

OTHER PUBLICATIONS

B. Dufrasne, et al., "IBM DS8880 and IBM Z Synergy", IBM Redbooks, Document REDP-5186-03, Apr. 2019, pp. 132.

(Continued)

*Primary Examiner* — Jane Wei
(74) *Attorney, Agent, or Firm* — Konrad Raynes Davda & Victor LLP; David W. Victor

(57) ABSTRACT

Provided are a computer program product, system, and method for prefetching cache resources for a write request from a host to tracks in storage cached in a cache. Cache resources held for a plurality of tracks in a write set are released before expected writes are received for the tracks in the write set. Cache resources for tracks in the write set are obtained, following the release of the cache resources, to use for expected write requests to the tracks in the write set.

25 Claims, 8 Drawing Sheets

(56) References Cited

U.S. PATENT DOCUMENTS

| | | |
|---|---|---|
| 9,715,352 B2 | 7/2017 | Craddock et al. |
| 10,152,419 B2 | 12/2018 | Gschwind et al. |
| 10,528,474 B2 | 1/2020 | Bretschneider et al. |
| 10,672,099 B2 | 6/2020 | Imbrogno et al. |
| 10,691,566 B2 | 6/2020 | Anderson et al. |
| 2006/0190688 A1 | 8/2006 | Van Eijndhoven et al. |
| 2008/0040539 A1 | 2/2008 | Haustein et al. |
| 2010/0232057 A1 | 9/2010 | Sanvido et al. |
| 2013/0024626 A1 | 1/2013 | Benhase et al. |
| 2019/0073310 A1* | 3/2019 | Bretschneider ..... G06F 12/0868 |
| 2020/0042453 A1 | 2/2020 | Bretschneider et al. |
| 2020/0050384 A1 | 2/2020 | Gupta et al. |
| 2020/0174680 A1 | 6/2020 | Peterson et al. |
| 2020/0174691 A1 | 6/2020 | Peterson et al. |

OTHER PUBLICATIONS

U.S. Appl. No. 16/985,216, filed Aug. 4, 2020.
PCT International Search Report and Written Opinion dated Nov. 1, 2021, pp. 7, for Application No. PCT/B2021/056809.
Notice of Allowance dated Aug. 11, 2021, pp. 14, for U.S. Appl. No. 16/985,216.

* cited by examiner

Write Set Info

Track Access List Entry

Second Channel Write Request

OBTAINING CACHE RESOURCES FOR EXPECTED WRITES TO TRACKS IN A WRITE SET AFTER THE CACHE RESOURCES WERE RELEASED FOR THE TRACKS IN THE WRITE SET

BACKGROUND OF THE INVENTION

1. Field of the Invention

The present invention relates to a computer program product, system, and method for obtaining cache resources for expected writes to tracks in a write set after the cache resources were released for the tracks in the write set.

2. Description of the Related Art

In a storage environment, a host system may first communicate a read/write request to a connected storage system over a fast channel, such as a bus interface, or Peripheral Component Interconnect Express (PCIe) interface. For a read/write request over the fast channel, which is supposed to complete within a threshold time, the host system holds the application thread for the read/write request in a spin loop waiting for the request to complete. This saves processor time associated with a context swap, which deactivates the thread and reactivates the thread in response to an interrupt when a response to the read/write request is received. If the data for the read/write request sent on the fast channel is not in cache, then the storage system may fail the read/write request and the host system may communicate the same read/write request over a storage area network via a host adaptor, which is slower than processing the I/O request over the bus, e.g., PCIe interface. Communicating the read/write request over the second channel requires the host system to perform a context switch from the task handling the read/write request to another task while waiting for the read/write request to complete. Context switching is costly because it requires the processor running the task to clear all registers and L1 and L2 caches for the new task, and then when completing the new task, reactivate the context switched task and return the state data to the registers and L1 and L2 caches for the task that was context switched while waiting for the read/write request to complete.

Certain read/write operations need to be completed within a threshold time, else they are failed. To process a read or write request, the storage system will have to allocate cache resources, including resources and segments in cache storage and access track metadata to process the read or write request. The track metadata provides information on the format of data and layout of records in the track that are needed in order to perform reads and writes to the track. However, the allocation of cache resources, including accessing of metadata, from the storage comprises a substantial portion of the latency in processing read/write requests.

There is a need in the art for improved techniques for prefetching cache resources for host write requests to the cache on the fast channel so that the cache resources for tracks will be available when the write requests to the tracks are received on the fast channel.

SUMMARY

Provided are a computer program product, system, and method for prefetching cache resources for a write request from a host to tracks in storage cached in a cache. Cache resources held for a plurality of tracks in a write set are released before expected writes are received for the tracks in the write set. Cache resources for tracks in the write set are obtained, following the release of the cache resources, to use for expected write requests to the tracks in the write set.

With the above embodiment, releasing cache resources for tracks in a write set makes those resources available for other requests, which is optimal if the expected writes to the tracks in the write set are unable to proceed, such as to if access to the write set is quiesced due to an event, such as volume ineligibility due to long busy or unsupported copy services state or other processes. Following the release of the cache resources, re-obtaining the cache resources for the tracks for which they were released increases the likelihood that write requests sent by the host toward the write set are completed within a required threshold time, which is especially important for performance if a host thread is spinning on the write request task for the write request.

In a further embodiment, the cache resources are held for the write set for write requests received on a first channel from the host. Fail is returned to a first write request received on the first channel for a track in the write set for which cache resources are not available. A second write request to a track from the host is received on a second channel the host sends in response to receiving the fail to the first write request on the first channel. Obtaining the cache resources comprises estimating a number of writes the host could have sent on the second channel since the cache resources were released, determining a starting track that is the estimated number of writes following a cursor pointing to a track in the write set at which to start prefetching cache resources after the cache resources were released, and obtaining cache resources for sequential tracks in the write set from the starting track.

With the above embodiment, a number of writes the host could have performed on the second channel are estimated so that prefetching of those tracks that are estimated to have been written on the second channel are skipped, because cache resources are no longer needed for those tracks written on the second channel. In this way, prefetching is optimized by starting to prefetch after the quiesce from a first track in the write set that is likely not have to been written by a write request sent on the second channel.

In a further embodiment, the cache resources are held for the write set for write requests received on a first channel from the host. Fail is returned to a first write request received on the first channel for a track in the write set for which cache resources are not available. A second write request to a track is received from the host on a second channel, the host sends in response to receiving the fail to the first write request on the first channel. The second write request identifies the write set, wherein cache resources are obtained for sequential tracks in the write set from a track following the track written by the second write request.

With the above embodiment, obtaining cache resources for a track following the track written by the second write request on the second channel avoids prefetching for tracks already written on the second channel because the host is likely to not retry writing a track on the first channel that was successfully written on the second channel.

In a further embodiment, in response to receiving the second write request on the second channel identifying the write set, a last track retried field for the write set is set to indicate a last track written by the second write request. The cache resources are obtained from a track following the track indicated in the last track retried field.

With the above embodiment, cache resources are prefetched following the last track written on the second channel because the host may not try to re-access a track on the first channel already accessed on the second channel. In this way, recording the last track written allows prefetching of cache resources to follow the last written track so that cache resources are only obtained for tracks likely to be written on the first channel to avoid obtaining cache resources for tracks that will not be written.

In a further embodiment, the second write request further indicates whether the first write request will be retried on the first channel. The cache resources are obtained from the track following a track written by the second write request in response to the second write request indicating that the first write request will not be retried. Cache resources are obtained for sequential tracks in the write set from the track written by the second write request in response to the second write request indicating that the first write request will be retried.

With the above embodiment, the host provides a hint as to whether a failed write request that was retried on the second channel will also be retried on the first channel. This hint allows optimization by prefetching cache resources from the track written on the second channel because the host will also retry the write on the first channel, so that the cache resources are available for the write request on the first channel to allow the first channel write to complete.

Provided are a computer program product, system, and method for sending requests to a storage controller managing access to tracks in a storage. A first write request to a track in a write set is sent on a first channel to the storage controller. Cache resources for tracks in the write set are pre-allocated by the storage controller prior to receiving write requests to the tracks in the write set. A fail is received from the storage controller in response to the first write request. A second write request, for the track written by the first write request, is sent on a second channel in response to the fail of the first write request. The second write request indicates the write set to cause the storage controller to obtain cache resources for tracks in the write set following the track indicated in the second write request. The obtained cache resources are used for expected write requests to the tracks in the write set that will be sent on the first channel.

In a further embodiment, indication is made in the second write request of whether the first write request will be retried on the first channel. The storage controller is caused to obtain cache resources from the track written by the first write request in response the second write request indicating that the first write request will be retried on the second channel.

With the above embodiments, the host may specify to the storage controller whether or not the host will retry the write requests on the first channel to allow the storage controller to adjust prefetching to a sequential track in the write set following the last written track if the write requests will not be retried. Further, if the host will retry the write requests on the first channel, written on the second channel, then this indication of retry in the write request on the second channel ensures the cache resources will be obtained for the tracks written by the second channel write request for use during the first channel write requests. Further, in case the write requests on second channel are retried, the last track retried field is not set to indicate the last written track by the write request so that cache resources are obtained for those tracks retried on the second channel. This optimizes prefetch operations by adjusting the prefetching if needed to avoid prefetching cache resources for written tracks that will not be rewritten by a write request on the first channel, so that cache resources do not need to be obtained when not needed for retry writes on the first channel.

DETAILED DESCRIPTION

Access to a write set may be quiesced if there is an event that will prevent write access to the tracks for an extended period of time to allow other processes to access the tracks held for the write set, such as volume ineligibility due to long busy or unsupported copy services state or other processes. Quiescing access to tracks in a write set causes a release of the cache resources for the tracks in the write. Releasing the cache resources will cause failure for first channel write requests to retry writing to the tracks in the quiesced write set if there are no cache resources pre-allocated for these write requests when the requests are received.

By accessing the cache resources in advance of write requests on the first channel after the event that caused the cache resources to be released, such as a quiesce to the write set, latency in processing the access request is minimized. Further, by accessing cache resources in advance of the access request, described embodiments increase the likelihood that write requests sent by the host on a first fast channel are completed within a required threshold time for processing access requests on the first channel requiring fast processing. This keeps the time the host thread is spinning on the write request task for the write request sent on the bus interface within an acceptable time threshold. However, if the cache resources for a requested target track have not been allocated in advance of the request, after being released as a result of a quiesce of other operation, then the write request resent on the first channel may be failed again because it is unlikely the write request can complete within the threshold time given that the cache resources will have to be allocated. Failing the write request on the first channel causes the host to redrive the write request on the second channel. The processing of the write request on the second channel allocates the required cache resources when processing the access request.

Described embodiments provide improvements to computer technology for prefetching cache resources by re-obtaining cache resources for tracks in a write set that were released due to a quiesce or other process. Described embodiments use techniques to estimate where write requests on the first channel will begin if the host retries the failed first channel write request on a second channel. In this way, the storage system will optimize prefetching cache resources by re-obtaining cache resources for tracks in a write set that will likely be written by subsequent write requests on the first channel and avoid re-obtaining cache resources for tracks in the write set that will not again be accessed through write requests on the first channel.

Figure 1:
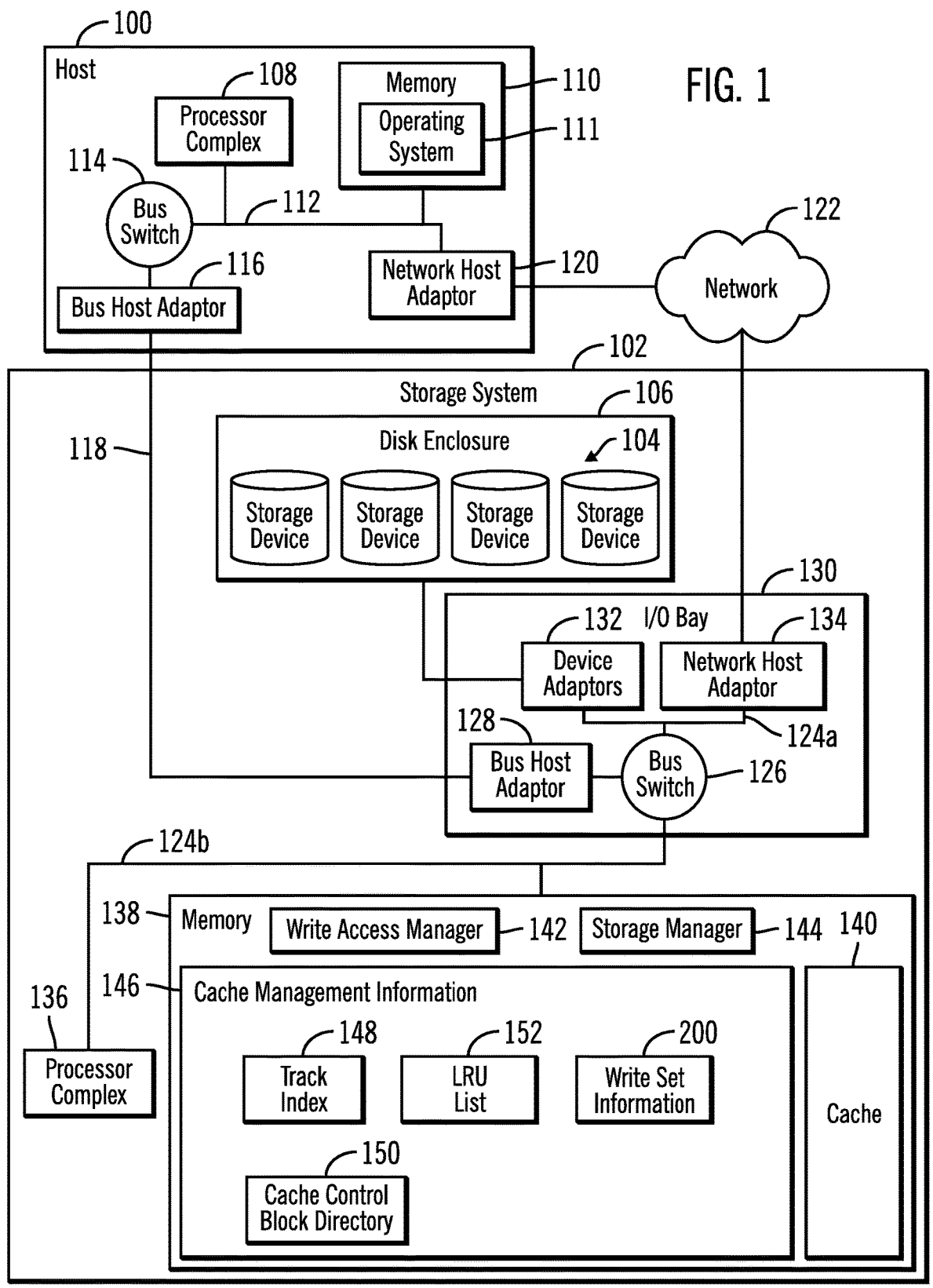
FIG. 1 illustrates an embodiment of a storage environment.

FIG. 1 illustrates an embodiment of a storage environment in which a host 100 directs read and write requests to a storage system 102, also referred to as a storage controller, control unit, server, to access tracks in volumes configured in storage devices 104 in a disk enclosure 106. The host 100 includes a processor complex 108 of one or more processor devices and a memory 110 including an operating system 111 executed by the processor complex 108. The host operating system 111 generates read and write requests to tracks configured in the storage devices 104. The host 100 includes hardware to communicate read and write requests on two different channels. A "first channel" may comprise a bus interface, such as a Peripheral Component Interconnect Express (PCIe), including a bus 112, a bus switch 114 to connect one or more devices on the bus 112, including the processor complex 108, a memory system 110, and a bus host adaptor 116 to extend the bus interface over an external bus interface cable 118 to the storage system 102. Additional bus interface technology to extend the bus interface may be utilized, including PCIe extender cables or components, such as a distributed PCIe switch, to allow PCIe over Ethernet, such as with the ExpEther technology.

A "second channel" to connect the host 100 and storage system 102 may use a network host adaptor 120, connected to the bus 112, that connects to a separate network 122 over which the host 100 and storage system 102 additionally communicate. The first channel through the bus interface may comprise a faster access channel than the second channel using the network 122 interface via the network host adaptor 120.

The storage system 102 includes a bus interface comprising a bus 124a, 124b, a bus switch 126 to connect to endpoint devices on the bus 124a, 124b, and a bus host adaptor 128 to connect to the external bus interface cable 118 to allow communication over the bus interface to the host 100 over the first channel. The storage system 102 includes an Input/Output bay 130 having the bus host adaptor 128, one or more device adaptors 132 to connect to the storage devices 104, and one or more network host adaptors 134 to connect to the network 122 and host systems.

The storage system 102 includes a processor complex 136 of one or more processor devices and a memory 138 having a cache 140 to cache tracks accessed by the connected hosts 100. The memory 138 includes a write access manager 142 to manage write requests to the cache 140 and a storage manager 144. The storage manager 144 manages access requests from processes in the hosts 100 and storage system 102 for tracks in the storage 104. The devices 136, 138, 128, 132, and 134 connect over the bus interface implemented in the bus lanes 124a, 124b and bus switch 126.

The write access cache manager 142 prefetches cache resources, including metadata, in the cache 140 for a defined write set for which host write requests are expected on the first channel so that such write requests may be completed fast with low latency.

A track may comprise any unit of data configured in the storage 104, such as a track, Logical Block Address (LBA), etc., which is part of a larger grouping of tracks, such as a volume, logical device, etc.

The write access manager 142 maintains cache management information 146 in the memory 138 to manage read (unmodified) and write (modified) tracks in the cache 140. The cache management information 146 may include a track index 148 providing an index of tracks in the cache 140 to cache control blocks in a control block directory 150; and a Least Recently Used (LRU) list 152 for tracks in the cache 140. The control block directory 150 includes the cache control blocks, where there is one cache control block for each track in the cache 140 providing metadata on the track in the cache 140. The track index 148 associates tracks with the cache control blocks providing information on the tracks in the cache 140. Upon determining that the cache LRU list 152 is full or has reached a threshold level, tracks are demoted from the LRU list 152 to make room for more tracks to stage into the cache 140 from the storage 104.

The cache management information 146 may further includes write set information 200 of a write set of tracks established by the host 100 for tracks to write on the first channel. The write access manager 140 may prefetch cache resources for tracks in the write set in advance of receiving write transactions. The host 100 may establish multiple write sets for multiple ranges of tracks for which track resources will be allocated in anticipation of multiple streams of sequential write transactions toward the different ranges of tracks.

The host operating system 111 may establish a write set 200 for a range of tracks 204 in advance of sending write requests for sequential write transactions to have the write access manager 142 pre-allocate cache resources for the write set in anticipation of the sequential write transactions that will likely soon be directed to those tracks indicated in the write set. These pre-allocated cache resources reduce the latency of processing the sequential write requests when they are eventually received. Further, by allocating cache resources for a limited (fixed number) of a first subset of tracks within the write set, cache resources are held for only those tracks most likely to be written as part of a sequential write stream. Further, the number of tracks for which cache resources are held is limited to allow those cache resources to be available for access by other processes in the host operating system 111 or other connected hosts 100.

A cache resource that is held and accessed for tracks in the range of tracks 302 may comprise a segment in cache 140 to use for the track to write, a segment in a non-volatile storage if a copy of write tracks is to be stored in a non-volatile storage in a same or different cluster, track metadata for the track, as well as other types of cache resources needed to process a write transaction toward the track.

In certain embodiments, there may be multiple hosts 100 that connect to the storage system 102 over the first and second channels to access tracks in the storage devices 104. In such case, the storage system 102 would have at least one bus host adaptor 128 to connect to the bus interface 118 of each connected host 100 and one or more network host adaptors 134 to connect to the network host adaptors 120 on the hosts 100.

In one embodiment, the bus interfaces 112, 114, 116, 118, 124a, 124b, 126, and 128 may comprise a Peripheral Component Interconnect Express (PCIe) bus interface technology. In alternative embodiments, the bus interfaces 112, 114, 116, 118, 124a, 124b, 126, and 128 may utilize suitable bus interface technology other than PCIe. The bus host adaptors 116 and 128 may comprise PCIe host adaptors that provide the interface to connect to the PCIe cable 118. The network 122 may comprise a Storage Area Network (SAN), a Local Area Network (LAN), a Wide Area Network (WAN), Fibre Connection (FICON®), the Internet, an Intranet, etc., and the network host adaptors 120, 134 provide the network 122 connections between the hosts 100 and storage system 102. (FICON is a registered trademark of International Business Machines Corporation throughout the world.

The storage system 102 may comprise a storage system, also known as a control unit and storage controller, such as the International Business Machines Corporation (IBM®) DS8000® and DS8880 storage systems, or storage controllers and storage systems from other vendors. (IBM and DS8000 are trademarks of International Business Machines Corporation throughout the world). The host operating system 111 may comprise an operating system such as Z Systems Operating System (Z/OS®) from International Business Machines Corporation ("IBM") or other operating systems known in the art. (Z/OS is a registered trademark of IBM throughout the world).

The storage devices 104 in the disk enclosure 106 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STT-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 104 in the disk enclosure 106 may comprise heterogeneous storage devices from different vendors and different types of storage devices, such as a first type of storage devices, e.g., hard disk drives, that have a slower data transfer rate than a second type of storage devices, e.g., SSDs.

Figure 2:
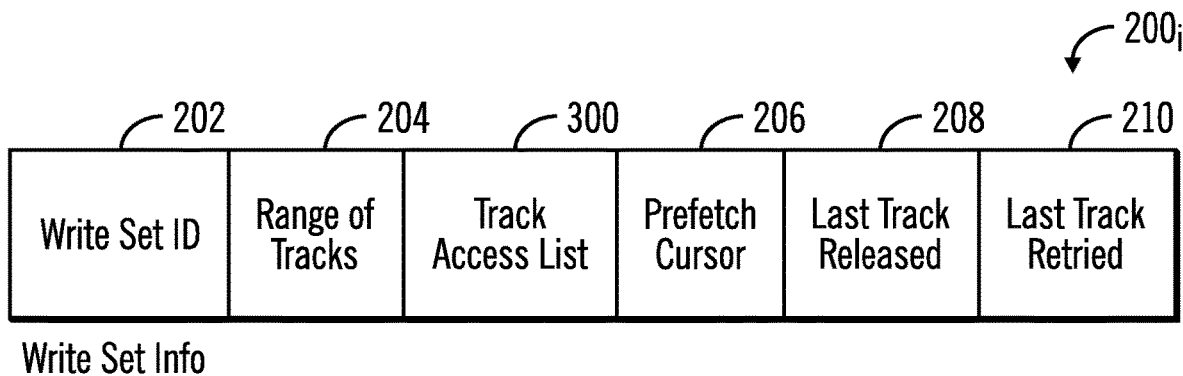
FIG. 2 illustrates an embodiment of write set information for an established write set.
Figure 7:
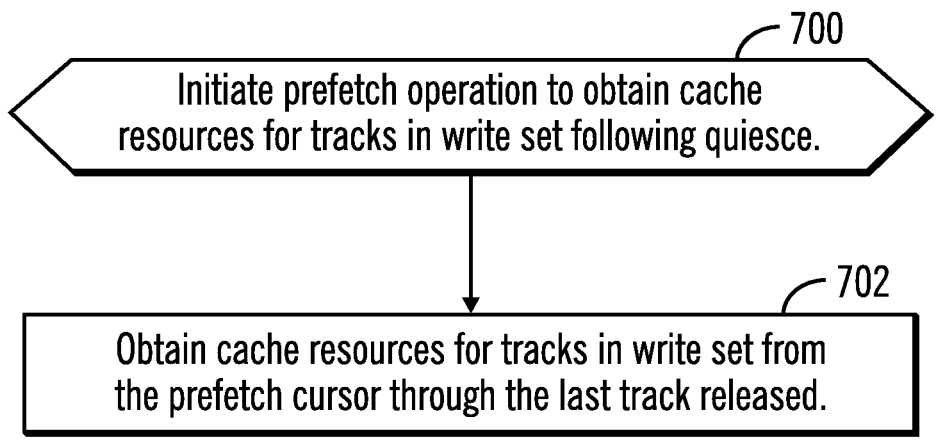
FIGS. 7, 8, 9, and 12 illustrates embodiments of operations to obtain cache resources for expected write requests on the first channel when the quiesce of the write set ends.
Figure 10:
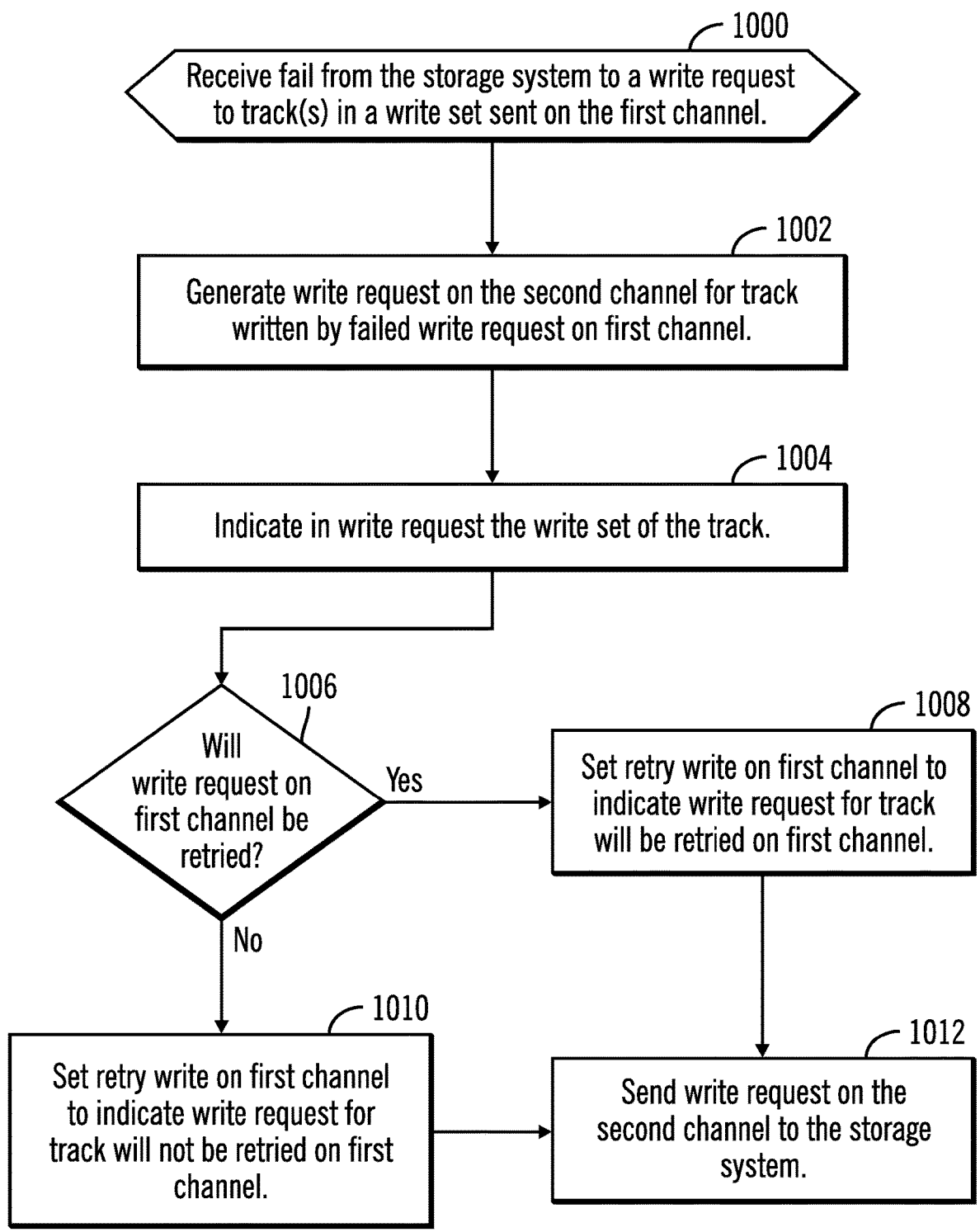
FIG. 10 illustrates an embodiment of operations performed by a host system to generate a second channel write request to a storage system to retry a failed write request sent on the first channel to write to the tracks.
Figure 11:
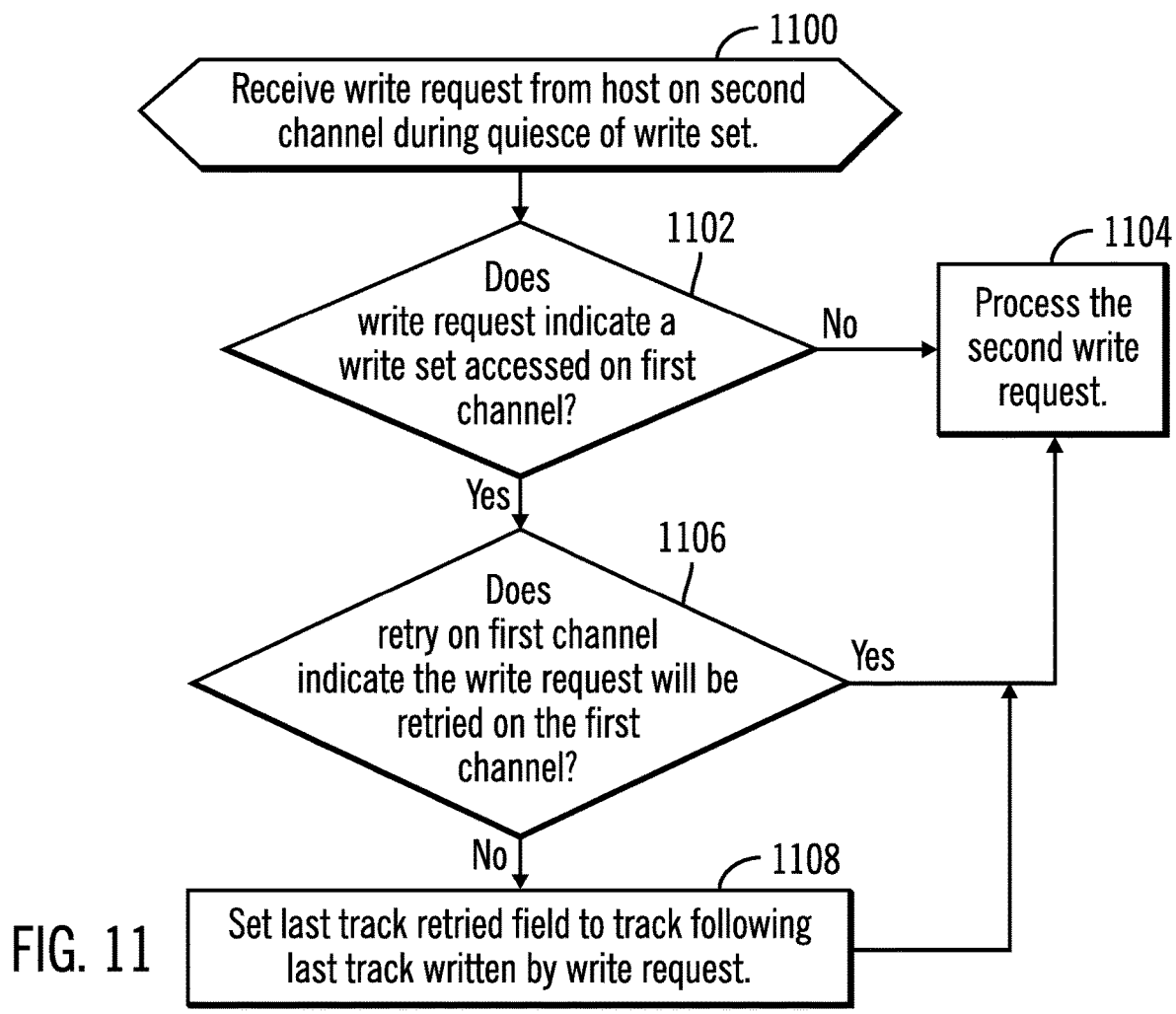
FIG. 11 illustrates an embodiment of operations performed by the storage system to process a second channel write request from the host.
Figure 12:
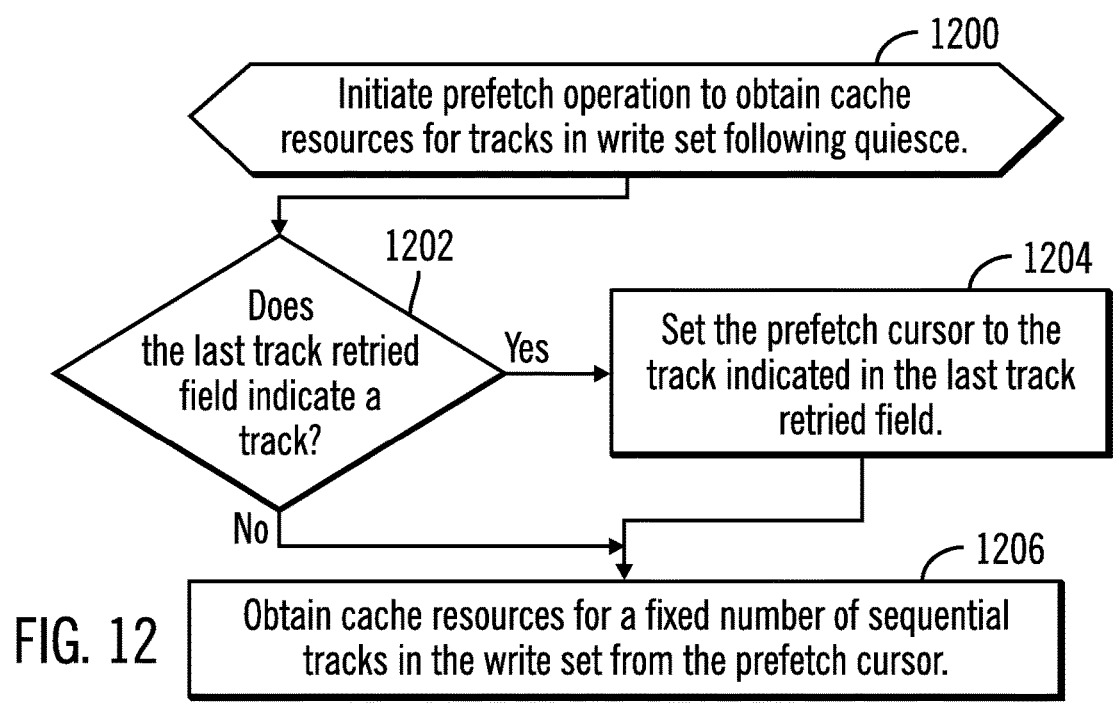

FIG. 2 illustrates an embodiment of an instance of write set information $200_i$ for an established write set to receive write requests on the first channel, including a write set identifier (ID) 202 providing a unique identifier of a write set; a range of tracks 204 to which sequential write transactions on the first channel are expected and for which cache resources should be accessed in advance of the sequential write transactions; a track access list 300 indicating for each track in the range of tracks 204 whether the cache resources are being held for the track and whether the track was written since receiving the establish write set $200_i$; a prefetch cursor 206 indicating a track in the range of tracks 302 from which cache resources should start being allocated for sequential write transactions in the write set 202; a last track released 208 field, used when embodiment of FIG. 7 implemented, indicating a last track for which cache resources are released; and a last track retried field 210, used in the embodiments of FIGS. 10, 11, and 12, comprising a track in the range of tracks 204 written by a write request sent on the second channel (components 120, 122, 134 in FIG. 1).

In certain embodiments, the prefetch cursor 206 may be set during regular processing to point at the track the write access manager 142 anticipates the host 100 to be writing (if actively writing) or to be writing next (if not actively writing). The prefetch cursor 206 points to where the write access manager 142 determines the host 100 is in their processing.

Figure 3:
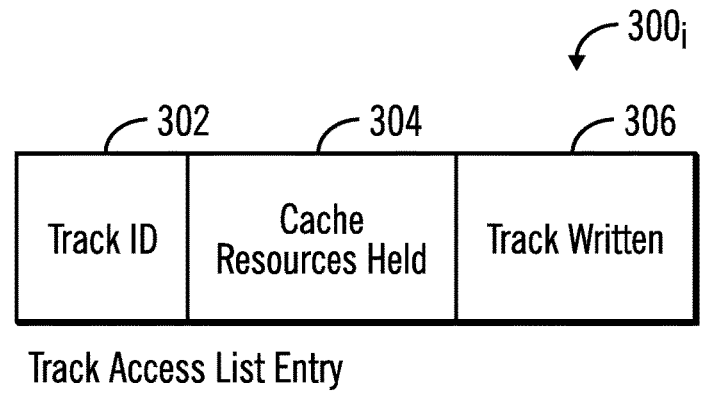
FIG. 3 illustrates an embodiment of a track access list entry in a track access list.

FIG. 3 illustrates an embodiment of a track access list entry $300_i$ in the track access list 300 indicating a track identifier (ID) 302; a cache resources held flag 304 indicating whether cache resources are being held for the track 302 and a track written flag 306 indicating whether the track 302 was written since the write set 202 was established.

Figure 4:
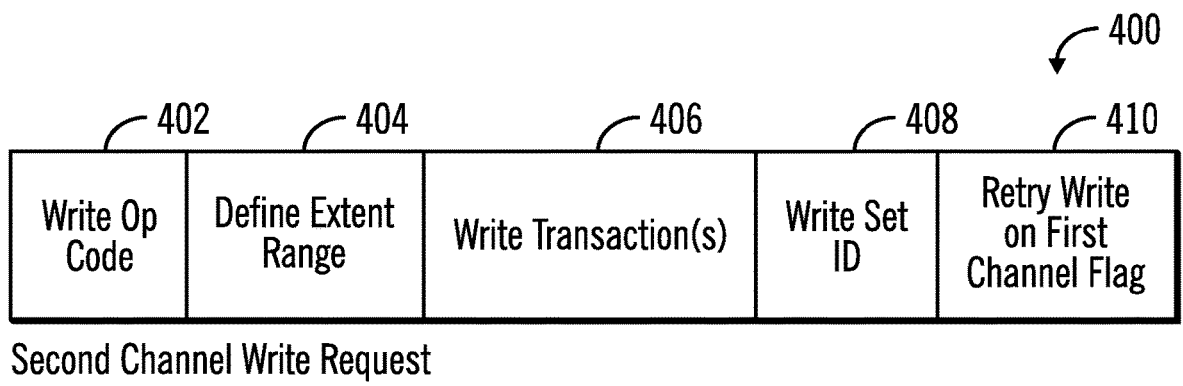
FIG. 4 illustrates an embodiment of a second channel write request sent on the second channel to retry a write request that failed on a first channel.

FIG. 4 illustrates an embodiment of a second channel write request 400 received on the second channel from the host 100, and includes: a write operation code 402; a define extent range 404 of a subset of tracks in a write set 408 to which the following one or more sequential write transactions 406 will be directed; and a retry on first channel flag 410 indicating whether the write transactions 406 in the second channel write request 400 will be subsequently retried on the faster first channel.

Figure 5:
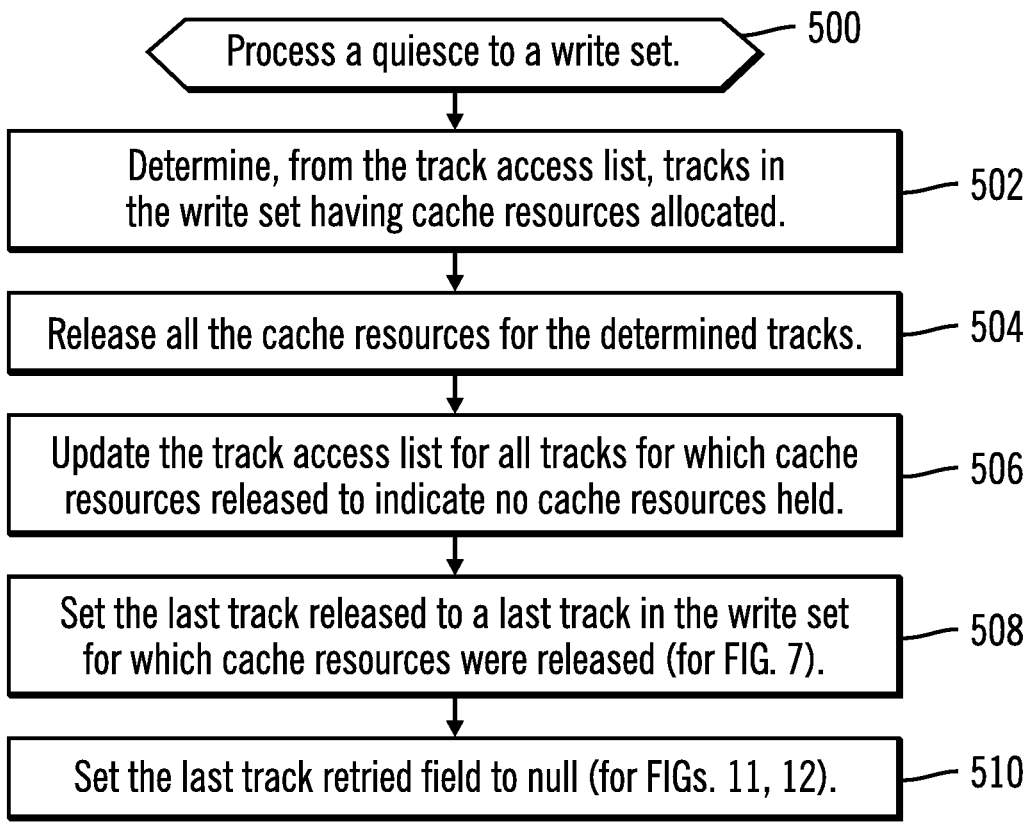
FIG. 5 illustrates an embodiment of operations to process a quiesce to a write set.

FIG. 5 illustrates an embodiment of operations performed by the write access manager 142 to process a quiesce to a write set. The quiesce may be caused by the volume including the write set becoming ineligible, there is no Input/Output (I/O) activity for an extended time with respect to the tracks associated with the write set, or there are copy operations, such as replication, mirroring, etc., directed to a volume including the write set, or other causes of quiesce to the write set. Upon processing (at block 500) a quiesce to a write set $200_i$, the write access manager 142 determines (at block 502), for the track access list 300 for the write set $200_i$, tracks in the write set having cache resources allocated, as indicated in field 304 of the track access list entries $300_i$ in the track access list 300 for the write set $200_i$. The cache resources are released (at block 504) with respect to the determined tracks. The write access manager 142 updates (at block 506) the track access list entries $300_i$ for all tracks for which cache resources were released to indicate no cache resources held 304. For the embodiment of FIG. 7, a last track released field 208 is set (at block 508) to a last track in the write set for which cache resources were released. For the embodiment of FIGS. 11 and 12, a last track retried 210 is set (at block 510) to null, indicating no write to the track since the quiesce ended.

With the embodiment of FIG. 5, upon processing a quiesce to tracks in a write set, the cache resources for those tracks in the write set are released to make available for other cache operations. Cache resources will need to be obtained again from the prefetch cursor 206 if writes on the first channel are to continue toward the write set.

Figure 6:
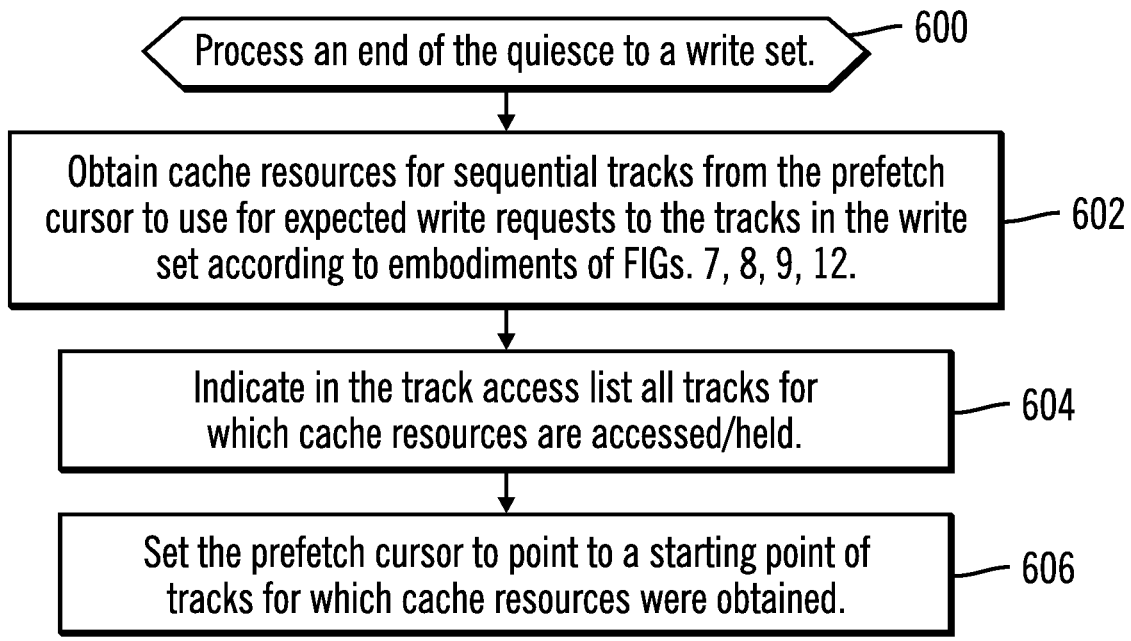
FIG. 6 illustrates an embodiment of operations to process an end of the quiesce to the write set.

FIG. 6 illustrates an embodiment of operations performed by the write access manager 142 to process an end to the quiesce to the write set. Upon processing (at block 600) an end to the quiesce, the write access manager 142 obtains (at block 602) cache resources for sequential tracks from the prefetch cursor 206 to use for expected write requests to the tracks in the write set according to one of the embodiments of FIGS. 7, 8, 9, 12. The prefetch cursor 206 may have been set prior to the quiesce during normal track prefetching operations in anticipation of write transfers from the host 100. The write access manager 142 indicates (at block 604) in the track access list 300 all tracks for which cache resources are accessed/held by setting field 304 (FIG. 3) to indicate that cache resources are held for the track 302. The prefetch cursor 206 is set (at block 606) to point to a starting point of tracks for which cache resources were obtained to allow for prefetching of cache resources that were released.

With the embodiment of FIG. 6, after the quiesce to the write set ends, cache resources are obtained for tracks in the write for which further writes are expected to be received on the first channel. The prefetching will start from the prefetch cursor 206 that was set prior to the quiesce during normal track prefetching. In this way, the prefetch cursor points to the start of the tracks for which cache resources were released. Obtaining the cache resources in advance of receiving write requests on the first channel allows the write requests to be proceed because the transaction can be processed very quickly with acceptable latency using the pre-allocated cache resources.

If the cache resources have not been allocated to allow low latency processing of the write request, then the write request is failed because the transaction will not likely complete within a fast time threshold. This determination is made to avoid host delays in processing other tasks while the host processor is spinning on the thread handling the write request while waiting for the write request to complete. If the cache resources have already been pre-allocated, than there is a high likelihood the write can complete on the first channel within the latency threshold required to avoid the host processor holding the thread for too long, which causes other I/O requests to be queued and delayed. Returning failure when the cache resources have not been pre-allocated causes the host thread waiting on the write request task to be deactivated and the host processor may context switch to processing other tasks, and then the write request is retried on the second network channel during the context switch.

Further, with described embodiments, once a write request is completed, the cache resources held for the target track may be released and the cache resources for a next track in the range of tracks may then be accessed.

FIG. 7 illustrates an embodiment of operations performed by the write access manager 142 for the prefetch operation at block 602 in FIG. 6. Upon initiating (at block 700) the prefetch operation at block 602 in FIG. 6 to obtain cache resources for first channel write requests, the write access manager 142 obtains (at block 702) cache resources for tracks in the write set $200_i$ from the prefetch cursor 206 through the last track released 208.

With the embodiment of FIG. 7, the write access manager 142 obtains resources for all tracks for which cache resources were released at block 504 (FIG. 5) to allow writes to continue against the write set on the fast first channel after the quiesce ends.

Figure 8:
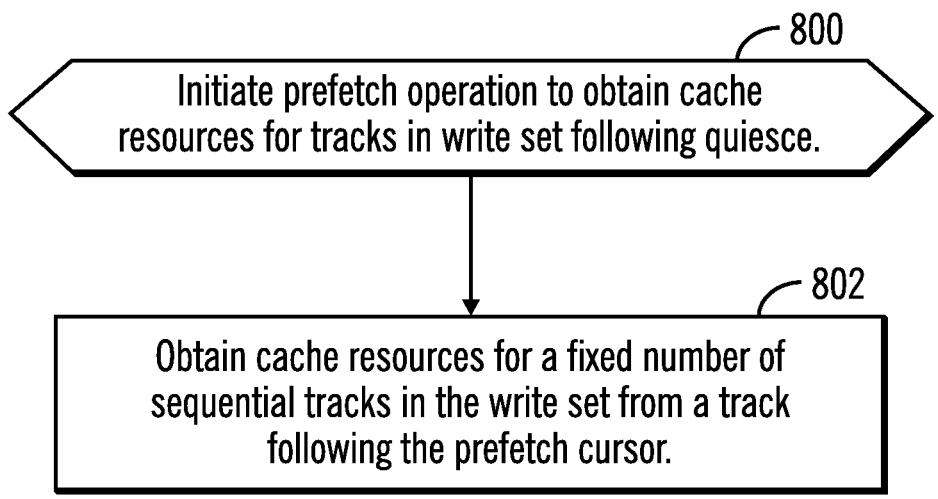

FIG. 8 illustrates an embodiment of operations performed by the write access manager 142 to perform the prefetch operation at block 602 in FIG. 6. Upon initiating (at block 800) the prefetch operation at block 602 in FIG. 6 to obtain cache resources for first channel write requests, the write access manager 142 obtains (at block 802) cache resources for a fixed number of sequential tracks in the write set $200_i$ following the prefetch cursor 206.

With the embodiment of FIG. 8, the write access manager 142 obtains resources for a fixed number of tracks from a track following the track pointed to by the prefetch cursor under the assumption the host 100 would have retried a write request on the second channel for a first of the tracks for which cache resources were released, which is identified by the prefetch cursor 206. By skipping the track identified by the prefetch cursor 206, or the track following the first track in the write set for which cache resources were released, the write access manager 142 avoids prefetching cache resources for a track that would likely have been written by a write request sent on the second channel after the write request fails on the first channel.

Figure 9:
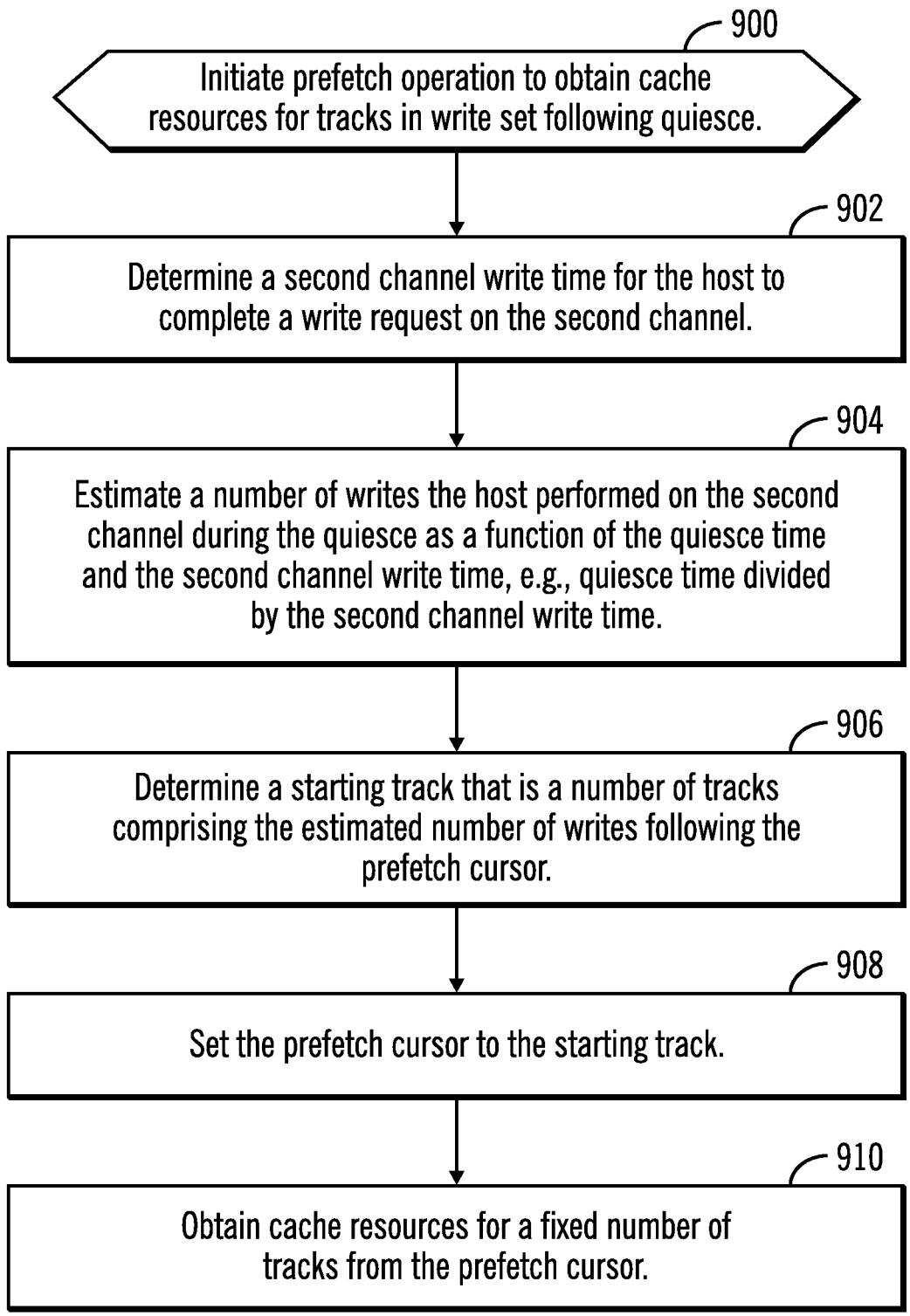

FIG. 9 illustrates an embodiment of operations performed by the write access manager 142 for the prefetch operation at block 602 in FIG. 6 by estimating a number of writes the host could 100 have sent on the second channel since the cache resources were released as part of the quiesce of the write set. Upon initiating (at block 900) the prefetch operation at block 602 in FIG. 6 to obtain cache resources for first channel write requests, the write access manager 142 determines (at block 902) a second channel write time for the host to complete a write request on the second channel, which may be a preset value or an average of time for recent second channel write requests to complete. The write access manager 142 estimates (at block 904) a number of writes the host performed on the second channel during the quiesce as a function of the quiesce time and the second channel write time, e.g., the quiesce time divided by the second channel write time. A starting track is determined (at block 906) as a number of tracks comprising the estimated number of writes following the prefetch cursor 206. The prefetch cursor 206 is then set (at block 908) to the starting track. The write access manager 142 obtains (at block 910) cache resources for a fixed number of tracks from the prefetch cursor, including the track at the prefetch cursor 206.

With the embodiment of FIG. 9, the write access manager 142 estimates a number of writes the host could have performed on the second channel to skip obtaining cache resources for those tracks that are estimated to have already been written on the second channel during the quiesce, because cache resources are no longer needed for those tracks written on the second channel. In this way, the embodiment of FIG. 9 optimizes prefetching by starting to prefetch after the quiesce from a first track in the write set that is likely not have to been written by a write request 400 sent on the second channel.

FIGS. 10, 11, and 12 illustrate an embodiment where the host 100 retries write requests that failed on the first channel on the second channel by encoding the write request on the second channel with information on where the write access manager 142 can start prefetching, including a write set ID 408 and a retry on first channel flag 410.

FIG. 10 illustrates an embodiment of operations performed by the host 100 operating system 111 upon receiving fail from the storage system 102 to a write request to track(s) in a write set $200_i$ sent on the first channel. Upon receiving (at block 1000) the fail, the host 100 generates (at block 1002) write request 400 on the second channel for the track(s) written by the failed write request on first channel. The write set $200_i$ of the track(s) to rewrite on the second channel is indicated (at block 1004) in the write set field 408. If (at block 1006) the host 100 is configured to retry the write request 400 on the first channel, then the retry on first channel flag 410 is set (at block 1008) to indicate the write request 400 will be retried on the first channel. If (at block 1006) the write request 400 is not to be retried on the first channel, then the retry on first channel flag 410 is set (at block 1010) to indicate the write request 400 will not be retried on the first channel. After setting the flag 410 at block 1008 or 1010, then the write request 400 is sent (at block 1012) on the second channel to the storage system 102.

FIG. 11 illustrates an embodiment of operations performed by the write access manager 142 of the storage system 102 to process a write request 400 from the host 100 on the second channel during a quiesce of writes to a write set. Upon receiving (at block 1100) a write request 400 on the second channel, the write access manager 142 determines (at block 1102) whether the write request 400 indicates a write set 408, established for write requests on the first channel. If (at block 1102) no write set 408 is indicated, then the second write request is processed (at block 1104). If (at block 1102) a write set 408 is indicated and the retry on first channel flag 410 indicates (at block 1106) that the write request, which failed on the first channel and resulted in the received write request 400, will not be retried on the first channel, then the last track retried field 210 for the write set 408 is set (at block 1108) to a track following the track (or last track) written by the write request 400. If (at block 1106) the retry on first channel flag 410 indicates the write request will be retried on the first channel or after setting (at block 1108) the last track retried field 210, the second write request 400 is processed (at block 1104) to write to the tracks in the write set.

FIG. 12 illustrates an embodiment of operations performed by the write access manager 142 to prefetch cache resources for tracks in a write set $200_i$ after the quiesce of access to the write set $200_i$ ends. Upon initiating (at block 1200) prefetch operations, if (at block 1202) the last track retried field 210 indicates a track, then the prefetch cursor 206 is set to the track indicated in the last track retried field 210. If (at block 1202) the last track retried field 210 does not indicate a track or after setting (at block 1204) the prefetch cursor 206, then the write access manager 142 obtains cache resources for a fixed number of sequential tracks in the write set from the prefetch cursor 206.

With the embodiment of FIGS. 10, 11, and 12, if the write request 400 will also be retried on the first channel, then the write access manager 142 will also have to obtain cache resources for the track(s) written by the write request 400 to successfully process the first channel write request. To ensure the cache resources will be obtained for the tracks written by the second channel write request 400, the last track retried field 210 is not set to indicate the last written track by the write request 400 so that cache resources are obtained from the current prefetch cursor 206 position. If the write request will not be retried on the first channel, then the write access manager 142 does not need to prefetch cache resources for the tracks written by the second channel write request 400. In such case, to skip prefetching for the just written track(s), the last track retried field 210 is set to a track following the last track written by the write request 400 so that the write access manager 142 will start prefetching after quiesce from tracks in the write set following the tracks written by the second channel write request 400.

With the embodiment of FIGS. 10, 11, and 12, the host 100 may specify to the write access manager 142 whether or not the host will retry the write requests on the first channel to allow the write access manager 142 to adjust the prefetch cursor 206 to a sequential track in the write set following the last written track if the write requests will not be retried. This optimizes prefetch operations by adjusting the prefetch cursor 206 if needed to avoid prefetching cache resources for written tracks that will not be accessed by a write request on the first channel, so that cache resources do not need to be obtained.

In one embodiment, where the second channel comprises a Fibre Connection (FICON®) link, which is the International Business Machines Corporation's (IBM) proprietary name for the ANSI FC-SB-3 Single-Byte Command Code Sets-3 Mapping Protocol for Fibre Channel (FC), the first channel comprises the IBM zHyperLink, and the host operating system 111 comprises Z/OS®, then the host 100 may retry a failed zHyperLink (first channel) write via the FICON interface (second channel) by adding new fields, such as the retry write one first channel flag 410 and a write set ID 408, to associate the FICON IO with the write set 408. This additional information allows the write access manager 142 to set the last track retried field 210 in the write set information $200_i$ for the particular track. When the write set quiesce completes, then the host 100 will start to re-obtain tracks after the last track retried 210. The host 100 may further have software hints to tell the storage system 102 that the host will retry the write on the zHyperLink (first channel) to control where the storage system 102 orients for prefetch.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
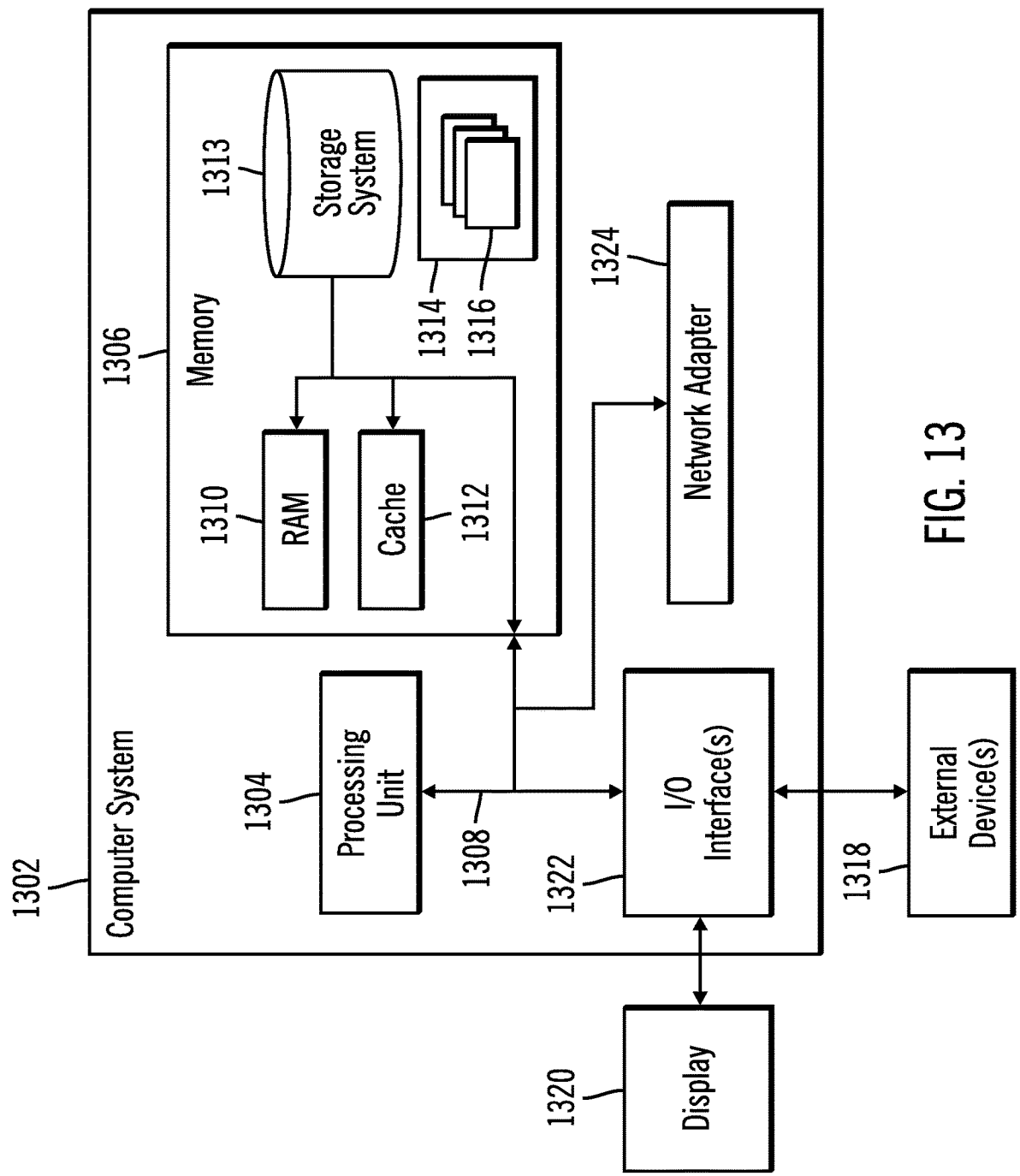
FIG. 13 illustrates an embodiment of a computer architecture used with described embodiments.

The computational components of FIG. 1, including the host 100 and storage system 102 may be implemented in one or more computer systems, such as the computer system 1302 shown in FIG. 13. Computer system/server 1302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, the computer system/server 1302 is shown in the form of a general-purpose computing device. The components of computer system/server 1302 may include, but are not limited to, one or more processors or processing units 1304, a system memory 1306, and a bus 1308 that couples various system components including system memory 1306 to processor 1304. Bus 1308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1302 typically includes a variety of computer system readable media. Such media may be any available media that is accessible by computer system/server 1302, and it includes both volatile and non-volatile media, removable and non-removable media.

System memory 1306 can include computer system readable media in the form of volatile memory, such as random access memory (RAM) 1310 and/or cache memory 1312. Computer system/server 1302 may further include other removable/non-removable, volatile/non-volatile computer system storage media. By way of example only, storage system 1313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1308 by one or more data media interfaces. As will be further depicted and described below, memory 1306 may include at least one program product having a set (e.g., at least one) of program modules that are configured to carry out the functions of embodiments of the invention.

Program/utility 1314, having a set (at least one) of program modules 1316, may be stored in memory 1306 by way of example, and not limitation, as well as an operating system, one or more application programs, other program modules, and program data. Each of the operating system, one or more application programs, other program modules, and program data or some combination thereof, may include an implementation of a networking environment. The components of the computer 1302 may be implemented as program modules 1316 which generally carry out the functions and/or methodologies of embodiments of the invention as described herein. The systems of FIG. 1 may be implemented in one or more computer systems 1302, where if they are implemented in multiple computer systems 1302, then the computer systems may communicate over a network.

Computer system/server 1302 may also communicate with one or more external devices 1318 such as a keyboard, a pointing device, a display 1320, etc.; one or more devices that enable a user to interact with computer system/server 1302; and/or any devices (e.g., network card, modem, etc.) that enable computer system/server 1302 to communicate with one or more other computing devices. Such communication can occur via Input/Output (I/O) interfaces 1322. Still yet, computer system/server 1302 can communicate with one or more networks such as a local area network (LAN), a general wide area network (WAN), and/or a public network (e.g., the Internet) via network adapter 1324. As depicted, network adapter 1324 communicates with the other components of computer system/server 1302 via bus 1308. It should be understood that although not shown, other hardware and/or software components could be used in conjunction with computer system/server 1302. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for prefetching cache resources for a write request from a host to tracks cached in a cache, wherein the tracks are stored in a storage, the computer program product comprising a computer readable storage medium having computer readable program code embodied therein that is executable to perform operations, the operations comprising:
  releasing cache resources held for tracks in a write set before expected writes are received for the tracks in the write set; and
  obtaining cache resources for the tracks in the write set, following the release of the cache resources, to use for the expected writes to the tracks in the write set.

2. The computer program product of claim 1, wherein the operations further comprise:
  maintaining a cursor for the write set indicating a track in the write set for which to start prefetching cache resources, wherein the obtaining cache resources comprises obtaining cache resources for sequential tracks in the write set starting from the track indicated by the cursor through a last track for which cache resources were released.

3. The computer program product of claim 1, wherein the obtaining cache resources comprises:
  maintaining a cursor for the write set indicating a track in the write set for which to start prefetching cache resources, wherein the obtaining cache resources comprises obtaining cache resources for a fixed number of sequential tracks in the write set starting from a track following the cursor.

4. The computer program product of claim 1, wherein cache resources are held for the write set for write requests received on a first channel from the host, wherein the operations further comprise:
  returning fail to a first write request received on the first channel for a track in the write set for which cache resources are not available; and
  receiving, from the host, a second write request to a track on a second channel the host sends in response to receiving the fail to the first write request on the first channel,
  wherein the obtaining cache resources comprises:
    estimating a number of writes the host could have sent on the second channel since the cache resources were released;
    determining a starting track that is the estimated number of writes following a cursor pointing to a track in the write set at which to start prefetching cache resources after the cache resources were released; and obtaining cache resources for sequential tracks in the write set from the starting track.

5. The computer program product of claim 4, wherein the estimating the number of writes the host could have performed comprises:
   determining a write time for the host to complete a write request on the second channel; and
   estimating the number of writes as a function of a quiesce time during which write requests to the write set were quiesced and the write time, wherein the estimated number of writes is a function of the quiesce time divided by the write time.

6. The computer program product of claim 1, wherein the cache resources are held for the write set for write requests received on a first channel from the host, wherein the operations further comprise:
   returning fail to a first write request received on the first channel for a track in the write set for which cache resources are not available; and
   receiving, from the host, a second write request to a track on a second channel, the host sends in response to receiving the fail to the first write request on the first channel, wherein the second write request identifies the write set, wherein cache resources are obtained for sequential tracks in the write set from a track following the track written by the second write request.

7. The computer program product of claim 6, wherein the operations further comprise:
   in response to receiving the second write request on the second channel identifying the write set, setting a last track retried field for the write set to indicate a last track written by the second write request, wherein the cache resources are obtained from a track following the track indicated in the last track retried field.

8. The computer program product of claim 6, wherein the second write request further indicates whether the first write request will be retried on the first channel, wherein the cache resources are obtained from the track following a track written by the second write request in response to the second write request indicating that the first write request will not be retried, wherein the operations further comprise:
   obtaining cache resources for sequential tracks in the write set from the track written by the second write request in response to the second write request indicating that the first write request will be retried.

9. The computer program product of claim 6, wherein the cache resources are released in response to a quiesce of write requests on the first channel to a volume including the write set, wherein the cache resources are obtained in response to ending of the quiesce of the write requests on the first channel.

10. A computer program product for sending requests to a storage controller managing access to tracks in a storage, the computer program product comprising a computer readable storage medium having computer readable program code embodied therein that is executable to perform operations, the operations comprising:
   sending a first write request to a track in a write set on a first channel to the storage controller, wherein cache resources for tracks in the write set are pre-allocated by the storage controller prior to receiving write requests to the tracks in the write set;
   receiving, from the storage controller, a fail in response to the first write request failing; and
   sending a second write request, for the track to which the failed first write request was directed, on a second channel, different from the first channel, in response to the fail of the first write request, wherein the second write request causes the storage controller to obtain cache resources for utilization for expected write requests to tracks in the write set to be resent on the first channel.

11. The computer program product of claim 10, wherein the operations further comprise:
   indicating in the second write request whether the first write request will be retried on the first channel, wherein the storage controller is caused to obtain cache resources from the track written by the first write request in response the second write request indicating that the first write request will be retried on the second channel.

12. A system for prefetching cache resources for a write request from a host to tracks in storage, comprising:
   a processor;
   a cache; and
   a computer readable storage medium having computer readable program code that when executed by the processor performs operations, the operations comprising:
      releasing cache resources held for tracks in a write set before expected writes are received for the tracks in the write set; and
      obtaining cache resources for the tracks in the write set, following the release of the cache resources, to use for the expected writes to the tracks in the write set.

13. The system of claim 12, wherein the cache resources are held for the write set for write requests received on a first channel from the host, wherein the operations further comprise:
   returning fail to a first write request received on the first channel for a track in the write set for which cache resources are not available; and
   receiving, from the host, a second write request to a track on a second channel the host sends in response to receiving the fail to the first write request on the first channel,
   wherein the obtaining cache resources comprises:
      estimating a number of writes the host could have sent on the second channel since the cache resources were released;
      determining a starting track that is the estimated number of writes following a cursor pointing to a track in the write set at which to start prefetching cache resources after the cache resources were released; and
      obtaining cache resources for sequential tracks in the write set from the starting track.

14. The system of claim 12, wherein the cache resources are held for the write set for write requests received on a first channel from the host, wherein the operations further comprise:
   returning fail to a first write request received on the first channel for a track in the write set for which cache resources are not available; and
   receiving, from the host, a second write request to a track on a second channel, the host sends in response to receiving the fail to the first write request on the first channel, wherein the second write request identifies the write set, wherein cache resources are obtained for sequential tracks in the write set from a track following the track written by the second write request.

15. The system of claim 14, wherein the operations further comprise:

in response to receiving the second write request on the second channel identifying the write set, setting a last track retried field for the write set to indicate a last track written by the second write request, wherein the cache resources are obtained from a track following the track indicated in the last track retried field.

16. The system of claim 14, wherein the second write request further indicates whether the first write request will be retried on the first channel, wherein the cache resources are obtained from the track following a track written by the second write request in response to the second write request indicating that the first write request will not be retried, wherein the operations further comprise:
    obtaining cache resources for sequential tracks in the write set from the track written by the second write request in response to the second write request indicating that the first write request will be retried.

17. The system of claim 14, wherein the cache resources are released in response to a quiesce of write requests on the first channel to a volume including the write set, wherein the cache resources are obtained in response to ending of the quiesce of the write requests on the first channel.

18. A system for sending requests to a storage controller managing access to tracks in a storage, comprising:
    a processor; and
    a computer readable storage medium having computer readable program code embodied therein that is executable to perform operations, the operations comprising:
        sending a first write request to a track in a write set on a first channel to the storage controller, wherein cache resources for tracks in the write set are pre-allocated by the storage controller prior to receiving write requests to the tracks in the write set;
        receiving, from the storage controller, a fail in response to the first write request failing; and
        sending a second write request, for the track to which the first write request was directed, on a second channel, different form the first channel, in response to the fail of the first write request, wherein the second write request causes the storage controller to obtain cache resources for utilization for expected write requests to tracks in the write set to be resent on the first channel.

19. The system of claim 18, wherein the operations further comprise:
    indicating in the second write request whether the first write request will be retried on the first channel, wherein the storage controller is caused to obtain cache resources from the track written by the first write request in response the second write request indicating that the first write request will be retried on the second channel.

20. A method for prefetching cache resources for a write request from a host to tracks in storage, comprising:
    releasing cache resources held for tracks in a write set before expected writes are received for the tracks in the write set; and
    obtaining cache resources for the tracks in the write set, following the release of the cache resources, to use for the expected writes to the tracks in the write set.

21. The method of claim 20, wherein the cache resources are held for the write set for write requests received on a first channel from the host, further comprising:
    returning fail to a first write request received on the first channel for a track in the write set for which cache resources are not available; and
    receiving, from the host, a second write request to a track on a second channel the host sends in response to receiving the fail to the first write request on the first channel,
    wherein the obtaining cache resources comprises:
        estimating a number of writes the host could have sent on the second channel since the cache resources were released;
        determining a starting track that is the estimated number of writes following a cursor pointing to a track in the write set at which to start prefetching cache resources after the cache resources were released; and
        obtaining cache resources for sequential tracks in the write set from the starting track.

22. The method of claim 20, wherein the cache resources are held for the write set for write requests received on a first channel from the host, further comprising:
    returning fail to a first write request received on the first channel for a track in the write set for which cache resources are not available; and
    receiving, from the host, a second write request to a track on a second channel, the host sends in response to receiving the fail to the first write request on the first channel, wherein the second write request identifies the write set, wherein cache resources are obtained for sequential tracks in the write set from a track following the track written by the second write request.

23. The method of claim 22, further comprising:
    in response to receiving the second write request on the second channel identifying the write set, setting a last track retried field for the write set to indicate a last track written by the second write request, wherein the cache resources are obtained from a track following the track indicated in the last track retried field.

24. The method of claim 22, wherein the second write request further indicates whether the first write request will be retried on the first channel, wherein the cache resources are obtained from the track following a track written by the second write request in response to the second write request indicating that the first write request will not be retried, further comprising:
    obtaining cache resources for sequential tracks in the write set from the track written by the second write request in response to the second write request indicating that the first write request will be retried.

25. The method of claim 22, wherein the cache resources are released in response to a quiesce of write requests on the first channel to a volume including the write set, wherein the cache resources are obtained in response to ending of the quiesce of the write requests on the first channel.

\* \* \* \* \*